(12) United States Patent
Grandi et al.

(10) Patent No.: US 6,918,069 B2
(45) Date of Patent: Jul. 12, 2005

(54) OPTIMUM THRESHOLD FOR FEC TRANSPONDERS

(75) Inventors: Emanuela Grandi, Pavia (IT); Mauro Macchi, Gorla Maggiore (IT)

(73) Assignee: Cisco Technology, Inc., San Jose, CA (US)

( * ) Notice: Subject to any disclaimer, the term of this patent is extended or adjusted under 35 U.S.C. 154(b) by 443 days.

(21) Appl. No.: 10/124,656

(22) Filed: Apr. 16, 2002

(65) Prior Publication Data

US 2003/0196154 A1 Oct. 16, 2003

(51) Int. Cl.$^7$ ................................................. H04L 1/20
(52) U.S. Cl. ........................ 714/704; 398/27; 714/708
(58) Field of Search ............................... 714/704, 708; 398/27

(56) References Cited

U.S. PATENT DOCUMENTS

| | | | |
|---|---|---|---|
| 4,823,360 A | | 4/1989 | Tremblay et al. ............... 375/4 |
| 5,896,391 A | | 4/1999 | Solheim et al. ............... 371/5.1 |
| 6,433,904 B1 | * | 8/2002 | Swanson et al. ............... 398/91 |
| 6,513,136 B1 | * | 1/2003 | Barker ........................ 714/704 |
| 6,519,302 B1 | | 2/2003 | Bruce et al. ................. 375/355 |
| 6,532,087 B1 | * | 3/2003 | Ransford et al. .............. 398/27 |
| 6,662,317 B2 | * | 12/2003 | Tomofuji ...................... 714/48 |
| 6,690,884 B1 | * | 2/2004 | Kelty et al. ................. 714/708 |
| 6,715,113 B1 | * | 3/2004 | Bendak et al. ............... 714/708 |
| 6,735,259 B1 | * | 5/2004 | Roberts et al. ............. 375/316 |
| 6,782,009 B1 | * | 8/2004 | Giorgetta et al. ........... 370/539 |

FOREIGN PATENT DOCUMENTS

| | | | | |
|---|---|---|---|---|
| EP | 1 085 713 | | 3/2001 | ........... H04L/25/06 |
| EP | 1 231 746 | | 8/2002 | ........... H04L/25/03 |

* cited by examiner

*Primary Examiner*—Stephen M. Baker
(74) *Attorney, Agent, or Firm*—Ritter, Lang & Kaplan LLP

(57) ABSTRACT

An optical receiver threshold may be optimized in real time based on a forward error correction (FEC) error statistics. A relative number of corrected ones as compared to corrected zeros is tracked. The threshold is shifted in response to an imbalance between the two types of errors.

15 Claims, 3 Drawing Sheets

OPTIMUM THRESHOLD FOR FEC TRANSPONDERS

BACKGROUND OF THE INVENTION

The present invention relates to communication systems and more particularly to optical receivers in one embodiment.

Maximizing optical receiver sensitivity is important to improving optical communication link performance. In particular, optical receiver sensitivity contributes to transmission distance and maximum data rate. For a given transmission distance, modulation scheme, and data rate, increasing receiver sensitivity can increase the spacing between optical amplification sites. The challenge is to accurately recover data from weak signals.

For conventional optical communication links employing amplitude modulation, the typical optical receiver configuration incorporates a photodetector for recovering an electrical modulation signal from the received light and some type of threshold device for converting the recovered signal to a sequence of zeros and ones that reflect transmitted data. Increasingly, forward error correction (FEC) codes are used to improve link performance and thus the optical receiver may also incorporate a decoder.

In some respects, optical receivers do not differ in their basic architecture from certain receivers used in other transmission media such as wireless, copper, etc. One point of difference, however, concerns threshold operations. In other types of systems, the threshold will typically be set at a midpoint of the modulation envelope with received signal levels above the midpoint being treated as ones, for example, and received signal levels below the midpoint being treated as zeros.

This positioning of the threshold at midpoint, however, assumes that noise levels are independent of the transmitted data. In optical systems, however, noise levels are typically greater during periods when a one is transmitted than when a zero is transmitted. Furthermore, the extent of this effect varies depending on the particular characteristics of the optical communication link.

Thus, using a modulation envelope midpoint as the threshold leads to non-optimal receiver operation. Shifting the threshold somewhat lower to accommodate the greater expected noise on the one data leads to a greater likelihood of accurately recovering the transmitted data, thereby increasing sensitivity. But no one fixed threshold will be appropriate in every situation and in fact the ideal position of the threshold for maximum likelihood detection of transmitted data will vary somewhat over time.

In one prior art approach to implementing a receiver capable of varying its decision threshold, a duplicate photodetector and thresholding stage are provided. The received optical signals split between a primary receiver chain and the duplicate components. The threshold used in the duplicate receiver chain is varied to find a minimum error point. Then this threshold level is adopted by the primary receiver chain for use in recovering the transmitted data. One problem with this approach is that it requires duplication of expensive receiver components such as photodiodes. Another problem is that the optimal position of the threshold in fact depends in part on photodiode characteristics and these will vary between the primary receiver and the duplicate receiver such that a threshold found to be optimal for the duplicate receiver will not necessarily be optimal for the primary receiver.

What is needed are systems and methods for controlling optical receiver threshold to optimize recovery of transmitted data while not significantly increasing costs.

SUMMARY OF THE INVENTION

By virtue of one embodiment of the present invention, an optical receiver threshold may be optimized in real time based on a forward error correction (FEC) error statistics. A relative number of corrected ones as compared to corrected zeros is tracked. The threshold is shifted in response to an imbalance between the two types of errors.

A first aspect of the present invention provides a method for operating a data receiver. The method includes: comparing a received signal to a threshold to generate a stream of estimated transmitted bits, decoding the estimated transmitted bits in accordance with an error correcting code while maintaining counts of "0" bits and "1" bits corrected during decoding, and adjusting the threshold in accordance with the counts of "0" bits and "1" bits corrected during decoding.

A second aspect of the present invention provides apparatus for operating a data receiver. The apparatus includes: a threshold block that compares a received signal to a threshold to generate a stream of estimated transmitted bits, an error correction decoder that corrects the estimated transmitted bits in accordance with an error correcting code while maintaining counts of "0" bits and "1" bits corrected during decoding, and a threshold adjustment block that adjusts the threshold in accordance with the counts of "0" bits and "1" bits corrected during decoding.

Further understanding of the nature and advantages of the inventions herein may be realized by reference to the remaining portions of the specification and the attached drawings.

DESCRIPTION OF SPECIFIC EMBODIMENTS

The present invention may be applied in the context of an optical receiver at the end of a optimal communication link. The present invention is, however, not limited to optical applications.

Figure 1:
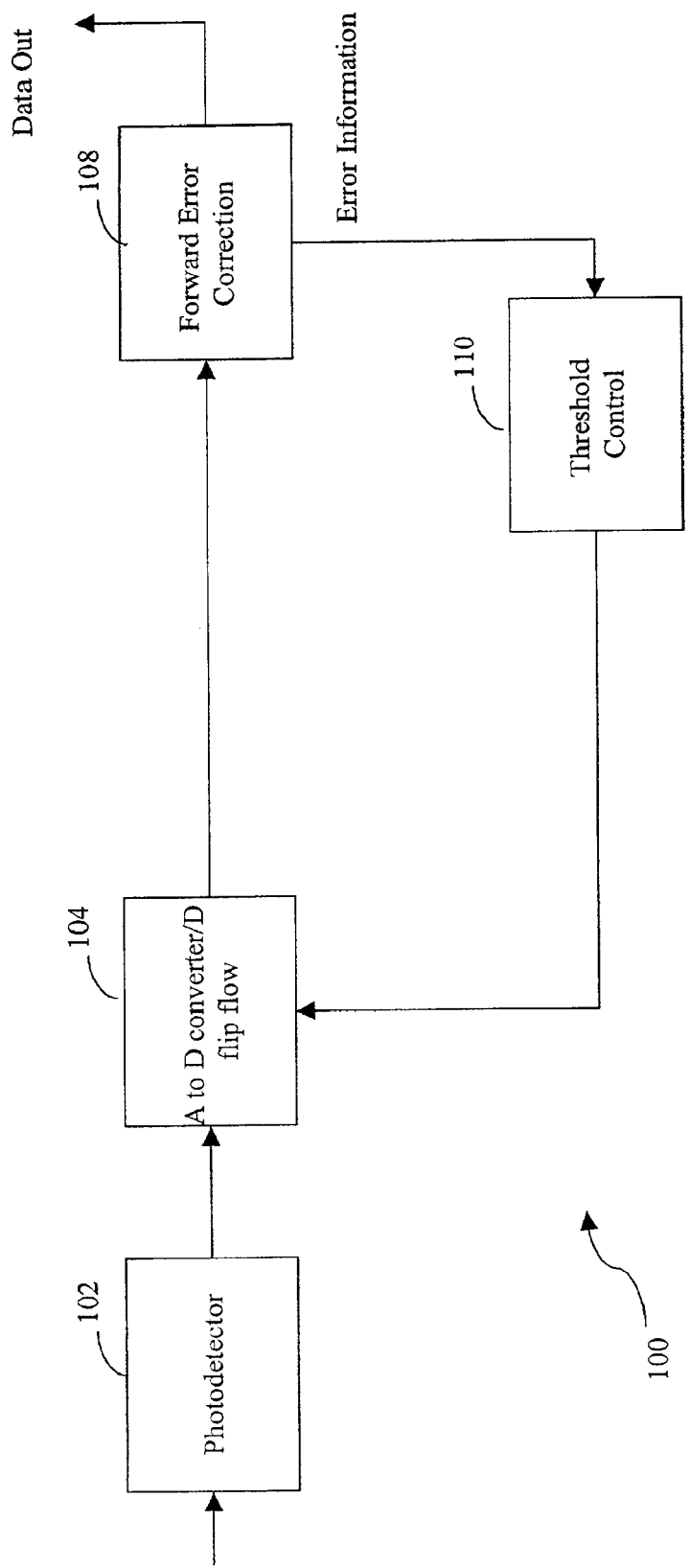
FIG. 1 depicts an optical receiver according to one embodiment of the present invention.

FIG. 1 depicts an optical receiver 100 according to one embodiment of the present invention. Optical receiver 100 may, e.g., terminate an optical communication link such as defined by a selected wavelength of a WDM communication link. In one embodiment, the selected wavelength is modulated with a 10 Gbps signal.

An optical signal is input to a photodetector 102 that incorporates a photodiode. Photodetector 102 may also incorporate analog signal conditioning circuitry as known in the art. The output of photodetector 102 is an analog signal that is input to an analog to digital converter/D flip-flop 104 that converts the analog signal to 1-bit samples and periodically latches the samples. The output of analog to digital converter/D flip-flop 104 is a series of 1-bit digital samples. Analog to digital converter/D flip-flow 104 may be understood to be a thresholding block with an analog input.

Analog to digital converter/D flip-flop 104 converts the analog signal to a digital one if the signal is above a programmable threshold or to a digital zero if the analog signal is below this threshold. A 1-bit sample is output every sampling period. A forward error correction block 108 decodes the digital data output by analog to digital converter/D flip-flop 104 in accordance with an error correcting code applied at the transmit end.

In one embodiment, this error correcting code is a Reed Solomon code as specified by the ITU G.975 standard. The output of forward error correction block 108 is decoded data.

The decoding process is performed on successive codewords. Within each codeword certain bit positions are allocated to data while other bits provide redundant information for the purpose of detecting and correcting errors in the data bits. Thus, certain data bits will be left untouched by the error correction process while others will have their values changed based on the contents of the redundant information.

The error correction process changes some zero values to ones and vice versa. A periodic running total of the number of each type of correction is output by forward error correction block 108 to a threshold control block 110. As will be explained, threshold control block 110 makes use of the relative number of zeros and ones corrected to determine the optimal placement of the threshold.

Figure 2:
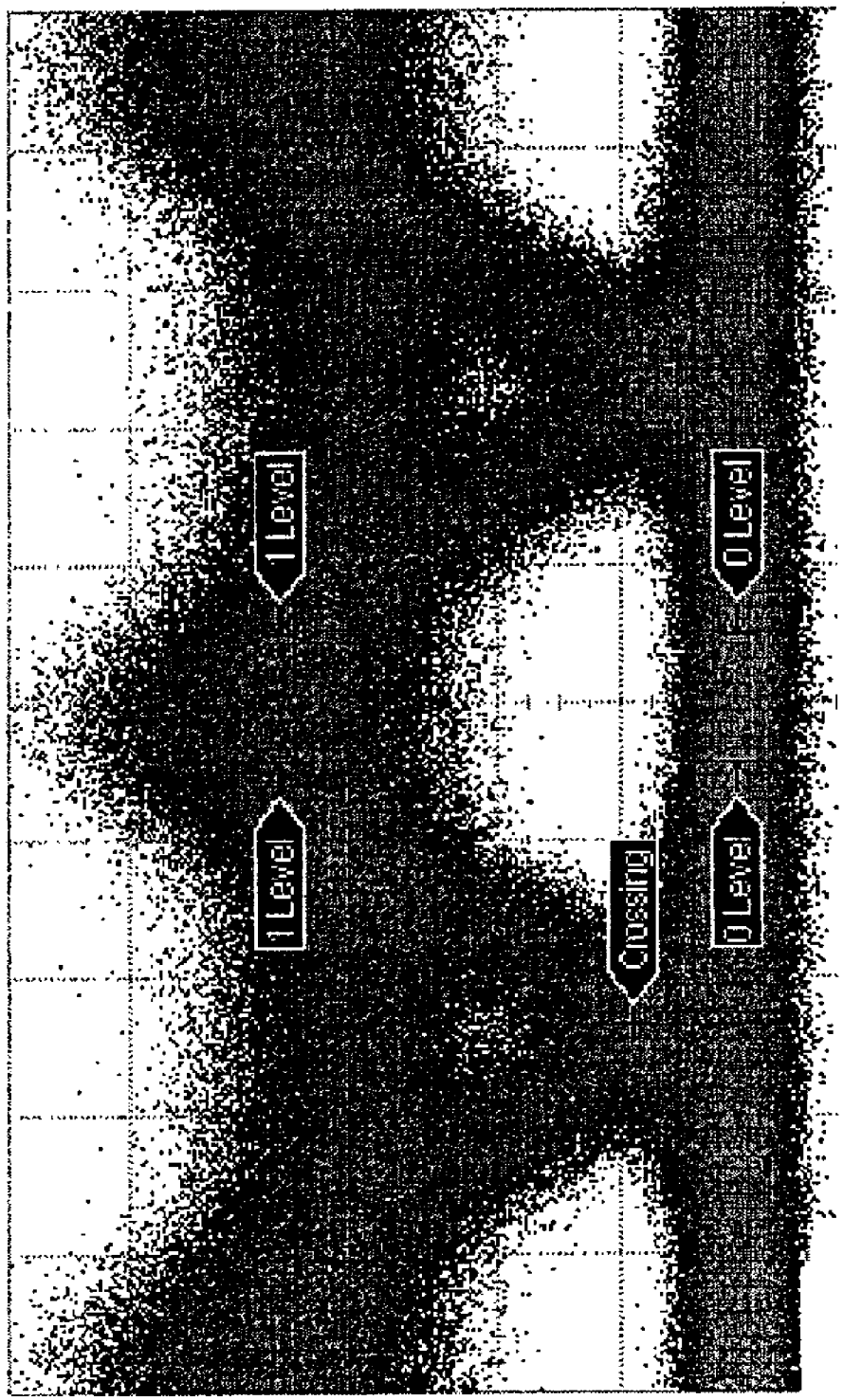
FIG. 2 depicts an "eye diagram" of a received modulated optical signal according to one embodiment of the present invention.

FIG. 2 depicts a so-called "eye diagram" for a received optical signal. The eye diagram shows modulation envelopes for successive received data bits superimposed on one another. The diagram assumes the use of amplitude modulation. The eye diagram shows how the received signals are affected by Gaussian noise. The "one level" designator denotes the nominal modulation level corresponding to a transmitted one bit while the "zero level" designator shows the nominal modulation level for a zero bit. The designator "crossing" denotes a trigger threshold for the sampling oscilloscope used to create the eye diagram. As can be seen, the noise level on the "one" bits is greater than the noise on the "zero" bits. Accordingly, the optimal threshold is below the modulation envelope midpoint.

The optimum position of the threshold depends on the relative amount of noise present on the one and zero bits and the relative noise levels will in turn depend on various characteristics of the optical communication link. These characteristics will vary over time. If the threshold is above the optimum, there will be more zero values corrected to ones while if the threshold is below the optimum, there will be more one values corrected to zeros.

According to one embodiment of the present invention, the relative number of corrected zeros and ones is used as an indicator of the needed level of adjustment. Accordingly, the threshold for deciding whether a zero or a one has in fact been sent is based on error statistics output by forward error correction block 108.

Figure 3:
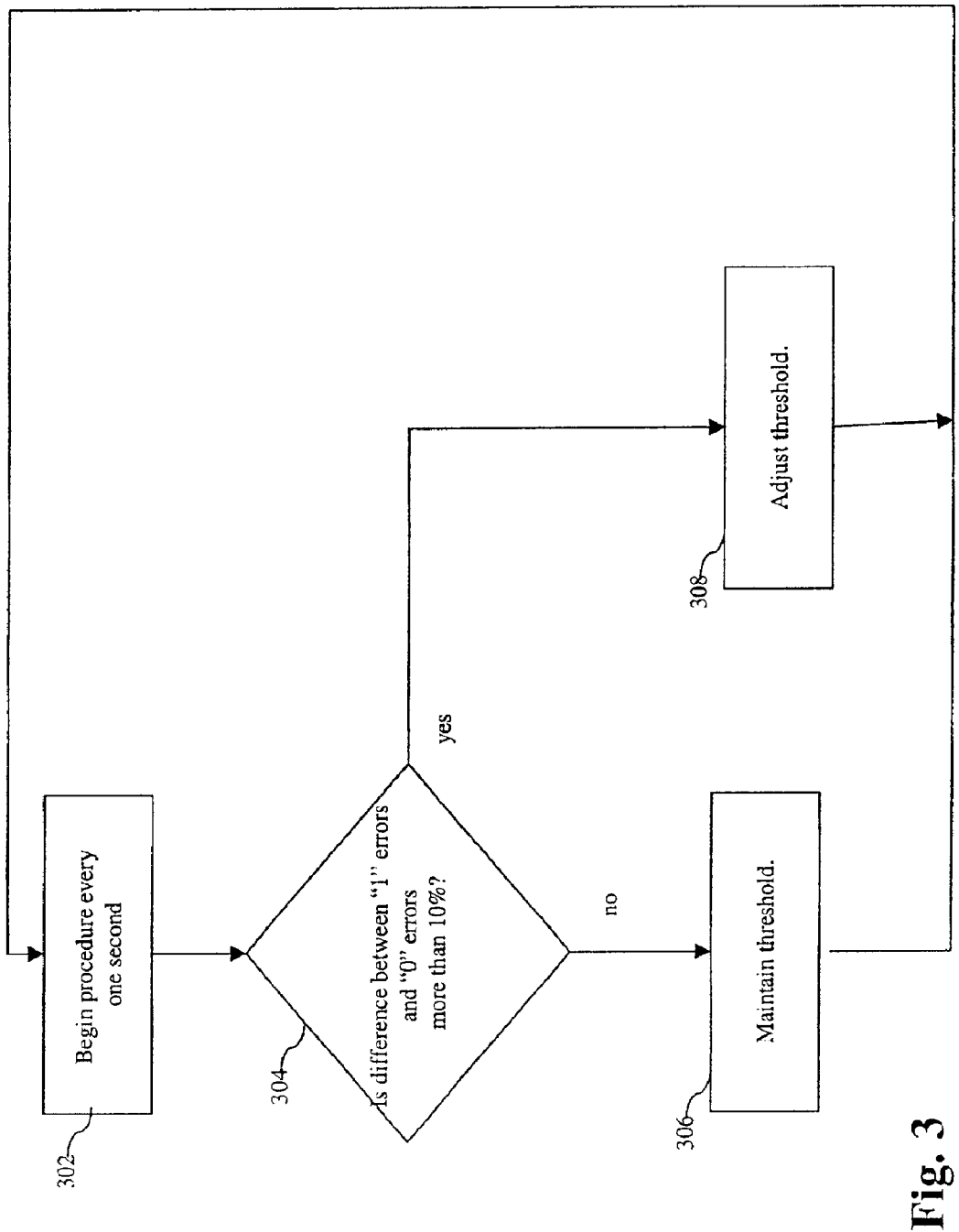
FIG. 3 depicts steps of dynamically controlling optical receiver threshold according to one embodiment of the present invention.

FIG. 3 is a flowchart describing steps of operating threshold control block 110 according to one embodiment of the present invention. A step 302 begins the threshold adjustment procedure. In one implementation, the procedure is invoked every one second. A step 304 reviews the number of corrected zeros and the number of corrected ones over the last one second and determines the difference between the error counts for the two types of errors is greater than 10%. If the difference in the number of errors is less than 10%, than a step 306 maintains the threshold at its current value.

If the difference between the error counts is greater than 10%, than the threshold is adjusted at step 308. In one implementation, the threshold is adjusted by 1/256 of the overall sample range, i.e., one step in a range that has been quantized to 8 bits. If the number of ones errors (i.e., received zeroes that have been corrected to one) exceeds the number of zero errors (i.e., received ones that have been corrected to zero) by 10% or more, the threshold is adjusted downward while if the number of zero errors exceeds the number of one errors by greater than 10%, the threshold is adjusted upward. It has been found that this relatively slow control loop offers good performance while avoiding unwanted oscillations.

Use of the threshold control feature of the present invention provides improved bit error rate performance at a given signal level. With the improvement in receiver sensitivity, the optical link designer is given additional margin with which to, e.g., extend transmission distance, reduce transmission power, etc.

It is understood that the examples and embodiments that are described herein are for illustrative purposes only and various modifications and changes in light thereof will be suggested to persons skilled in the art and are to be included within the spirit and purview of this application and scope of the appended claims and their full scope of equivalents.

What is claimed is:

1. A method for operating a data receiver, said method comprising:

comparing a received signal to a threshold to generate a stream of estimated transmitted bits;

decoding said estimated transmitted bits in accordance with an error correcting code while maintaining counts of "0" bits and "1" bits corrected during decoding; and adjusting said threshold toward an end of range value representing "0" when a number of corrected "1" bits exceeds a number of corrected "0" bits by approximately 10% during a period of predetermined duration.

2. The method of claim 1 wherein said received signal comprises an analog signal.

3. The method of claim 2 further comprising:

photodetecting an optical signal to generate said analog signal.

4. The method of claim 1 wherein a sample rate of said stream of bits is 10 Gbps.

5. The method of claim 1 wherein said error correcting code comprises a Reed-Solomon code.

6. The method of claim 5 wherein Reed-Solomon code is specified by ITU standard G.975.

7. Apparatus for operating a data receiver, said apparatus comprising:

a threshold block that compares a received signal to a threshold to generate a stream of estimated transmitted bits;

an error correction decoder that corrects said estimated transmitted bits in accordance with an error correcting code while maintaining counts of "0" bits and "1" bits corrected during decoding; and a threshold adjustment block that adjusts said threshold toward an end of range value representing "0" when a number of corrected "1" bits exceeds a number of corrected "0" bits by approximately 10% during a period of predetermined duration.

8. The apparatus of claim 7 wherein said threshold block comprises:

an analog to digital converter that converts an analog signal to said stream of estimated transmitted bits.

9. The apparatus of claim 8 further comprising:

a photodetector that detects an optical signal to generate said analog signal.

10. The apparatus of claim 7 wherein a rate of said stream of estimated transmitted bits is approximately 10 Gbps and said predetermined duration is approximately 1 second.

11. The apparatus of claim 7 wherein said error correcting code comprises a Reed-Solomon code.

12. The apparatus of claim 11 wherein Reed-Solomon code is specified by ITU standard G.975.

13. Apparatus for operating a data receiver, said method comprising:

comparing a received signal to a threshold to generate a stream of estimated transmitted bits;

means for decoding said estimated transmitted bits in accordance with an error correcting code while maintaining counts of "0" bits and "1" bits corrected during decoding; and means for adjusting said threshold toward an end of range value representing "0" when a number of corrected "1" bits exceeds a number of corrected "0" bits by approximately 10% during a period of predetermined duration.

14. The apparatus of claim 13 wherein said received signal comprises an analog signal.

15. The apparatus of claim 13 wherein a rate of said stream of estimated transmitted bits is approximately 10 Gbps and said predetermined duration is approximately 1 second.

* * * * *